Oct. 18, 1927.　　　M. A. ALFANO ET AL　　　1,646,336
LINE TIGHTENER
Filed April 27, 1927
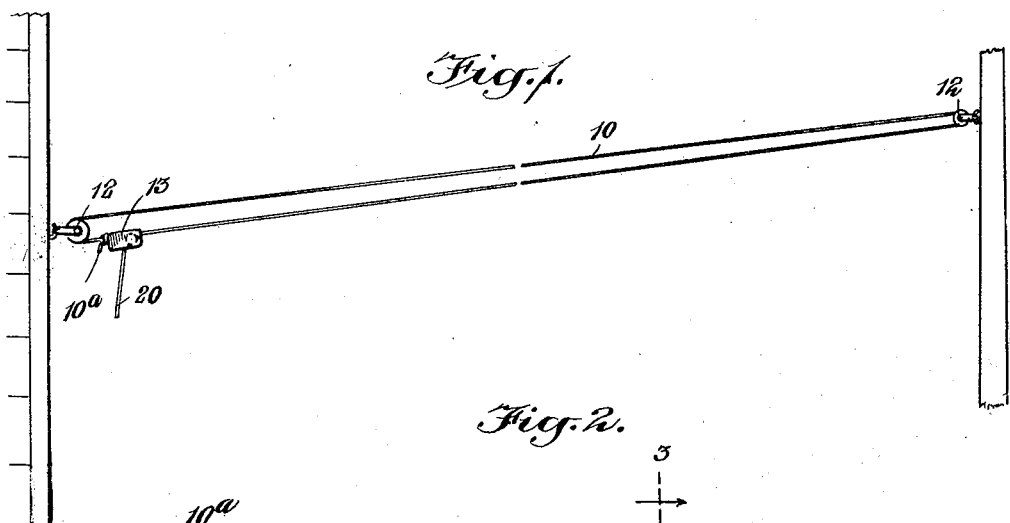
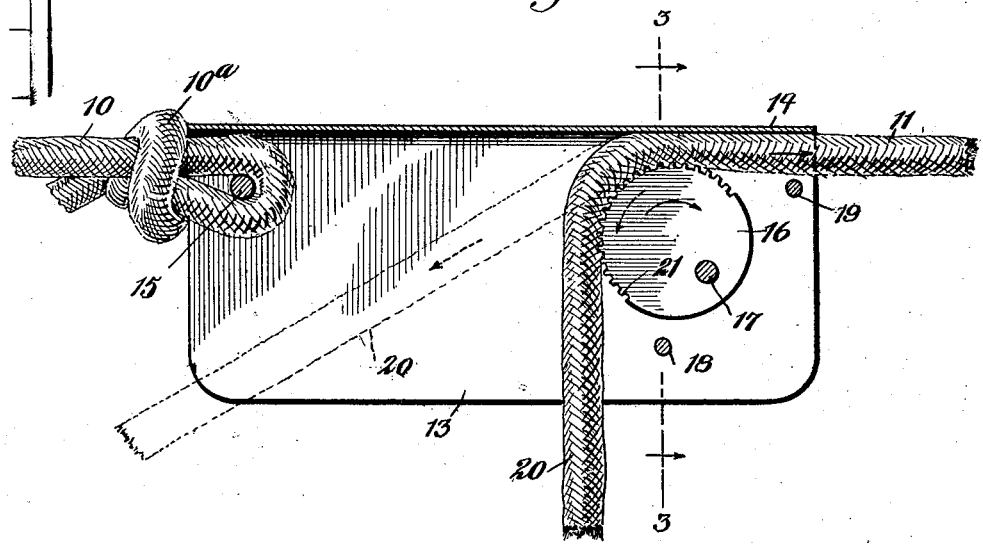
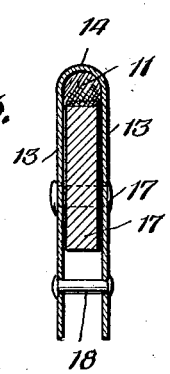
WITNESSES
INVENTORS
Matthew A. Alfano
Stephen Bohenek
By
ATTORNEY Patented Oct. 18, 1927.

1,646,336

UNITED STATES PATENT OFFICE.

MATTHEW A. ALFANO, OF GARFIELD, AND STEPHEN BOHENEK, OF PASSAIC, NEW JERSEY.

LINE TIGHTENER.

Application filed April 27, 1927. Serial No. 187,030.

The present invention is concerned with the provision of a line tightener which may have a wide range of utility, but which is primarily intended for tightening clothes lines or the like, so that the lines may be kept substantially taut at all times.

An object of the invention is to provide a device of this character of extremely simple construction, which may be conveniently manipulated for tightening the line or for releasing the line when slack is desired therein. The device is preferably so arranged that a slight pull on one end of the line to which the device is applied, may serve to either tighten the line or release it as desired in accordance with the particular direction in which the pull is exerted.

Further objects are to provide a device of this character which will be of practical construction, rugged, durable and efficient in use, easy to attach and operate, and well suited to the requirements of economical manufacture.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Fig. 1 is a broken perspective view showing a device of the present invention in use.

Fig. 2 is an enlarged longitudinal sectional view through the line tightener showing one end of a line anchored thereto, and the other end removably held thereby.

Fig. 3 is a transverse sectional view on the line 3—3 of Fig. 2.

The present device finds one of its preferred embodiments in a tightener for clothes lines, such for instance as a tightener for the line 10 of Fig. 1 which runs over a pair of pulleys 12, 12. Our improvement includes a pair of spaced parallel side plates 13, 13 preferably integrally connected at their top as indicated at 14. The two plates near one upper corner are connected by an anchoring member such for instance as the pin 15, and one end of the line 10 may be passed around this anchoring pin and knotted as at 10ª, thereby securely anchoring one end of the line to the tightener.

Adjacent the other end of the tightener an eccentric 16 is mounted on a pin 17, this eccentric swinging freely about the pin 17 between the plates 13 to an extent limited by a pair of stop pins 18 and 19. Pin 19 is arranged adjacent the upper corner of the plates, preventing swinging movement of the eccentric to an exposed position beyond the plate ends, while pin 18 is arranged below the eccentric and limits the gravitational movement of the latter when the eccentric is not engaged with the line 10.

The free end 20 of the rope 11 is passed between the pin 19 and the member 14 which connects the plates 13, and over the eccentric 16, this member being preferably roughened or toothed as at 21 to frictionally engage the line.

Referring now to Fig. 2 of the drawings, it will be noticed that a direct downward pull on the rope end 20 will first move the eccentric 16 against the pin 18 and then will subsequently cause the line 11 to be drawn inwardly, sliding over the surface of the eccentric until the desired tautness of the line has been obtained. Now when the line end 20 is gradually released, movement of the line 11 to the right will tend to carry with it the eccentric 16 so that the rope is firmly jammed between the member 14 and the eccentric 16. The harder the pull on the line, the more firmly the line is jammed and held by the eccentric.

When it is desired to release the line, it is simply necessary to swing the end 20 into approximately the dotted line position of Fig. 2, and pull the line slightly, permitting the eccentric 16 to gravitationally drop against the pin 18 at which time the line may be slacked off.

Obviously various changes and alterations might be made in the general form and arrangement of the parts described without departing from the invention. Hence we do not wish to limit ourselves to the details set forth, but shall consider ourselves at liberty to make such changes and alterations as fairly fall within the spirit and scope of the appended claim.

We claim:

In a line tightener of the class described, a sheet of metal bent to provide a pair of spaced parallel integrally connected plates, an eccentric freely rotatably mounted between the plates adjacent one end thereof, means for anchoring a rope end to the other end of the plates, and means limiting the rotary movement of the eccentric in both directions, said means comprising a pair of pins on opposite sides of the eccentric, one pin limiting the gravitational dropping of the eccentric when out of contact with the other end of the line passed between the eccentric and the intermediate portion of the sheet, the other pin preventing movement of the eccentric to inoperative position beyond the ends of the plates.

MATTHEW A. ALFANO.
STEPHEN BOHENEK.